US011658706B2

(12) United States Patent
Hao et al.

(10) Patent No.: US 11,658,706 B2
(45) Date of Patent: May 23, 2023

(54) CSI PROCESSING FOR FINE CSI GRANULARITY

(71) Applicant: QUALCOMM Incorporated, San Diego, CA (US)

(72) Inventors: Chenxi Hao, Beijing (CN); Yu Zhang, Beijing (CN); Min Huang, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/424,088

(22) PCT Filed: Jan. 22, 2020

(86) PCT No.: PCT/CN2020/073709
§ 371 (c)(1),
(2) Date: Jul. 19, 2021

(87) PCT Pub. No.: WO2020/151734
PCT Pub. Date: Jul. 30, 2020

(65) Prior Publication Data
US 2022/0103209 A1 Mar. 31, 2022

(30) Foreign Application Priority Data
Jan. 22, 2020 (CN) ................. PCT/CN2019/072625

(51) Int. Cl.
*H04B 7/0417* (2017.01)
*H04B 7/0456* (2017.01)
*H04L 5/00* (2006.01)

(52) U.S. Cl.
CPC ......... *H04B 7/0417* (2013.01); *H04B 7/0456* (2013.01); *H04L 5/0092* (2013.01)

(58) Field of Classification Search
CPC .................................................. H04B 7/0417
(Continued)

(56) References Cited

U.S. PATENT DOCUMENTS

2009/0046569 A1* 2/2009 Chen ..................... H04L 1/0029
370/203
2011/0134771 A1 6/2011 Chen et al.
(Continued)

FOREIGN PATENT DOCUMENTS

| CN | 102638337 A | 8/2012 |
| CN | 108880644 A | 11/2018 |
| CN | 108933648 A | 12/2018 |

OTHER PUBLICATIONS

Anonymous: "3rd Generation Partnership Project; Technical Specification Group Radio Access Network; NR; Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018].
(Continued)

*Primary Examiner* — Lihong Yu
(74) *Attorney, Agent, or Firm* — QUALCOMM Incorporated

(57) ABSTRACT

Certain aspects of the present disclosure provide techniques for channel state information (CSI) processing for fine granularity CSI. A method for wireless communications by a user equipment (UE) includes receiving a CSI reporting configuration. The CSI reporting configuration includes a number of frequency domain (FD) units and a FD unit size for CSI reporting. The UE determines a number of CSI processing units at the UE to use for processing the CSI report based on the number of FD units or the FD unit size for the CSI report. The UE processes the CSI report based on the determined number CSI processing units. In another method, the UE determines at least one threshold to use for
(Continued)

determining whether to update a CSI report based on the number of FD units or the FD unit size for CSI reporting.

28 Claims, 12 Drawing Sheets

(58) Field of Classification Search
USPC .......................................................... 375/267
See application file for complete search history.

(56) References Cited

U.S. PATENT DOCUMENTS

| | | |
|---|---|---|
| 2014/0226509 A1 | 8/2014 | Ko et al. |
| 2017/0201308 A1 | 7/2017 | Park et al. |
| 2017/0366377 A1 | 12/2017 | Papasakellariou |
| 2018/0019796 A1 | 1/2018 | Park |
| 2019/0109626 A1* | 4/2019 | Park ..................... H04B 7/0626 |
| 2020/0235797 A1* | 7/2020 | Kim ..................... H04W 72/085 |

OTHER PUBLICATIONS

International Search Report and Written Opinion—PCT/CN2019/072625—ISA/EPO—dated Mar. 27, 2019.
International Search Report and Written Opinion—PCT/CN2020/073709—ISAEPO—dated Apr. 26, 2020.
3GPP TS 38.214, "3rd Generation Partnership Project, Technical Specification Group Radio Access Network, NR, Physical Layer Procedures for Data (Release 15)", 3GPP TS 38.214-F40, V15.4.0, Dec. 2018, XP051575592, pp. 1-102, Section 5.2.2.4 and 5.2.3, par.5.2.1.2-5.2.1.6.
Supplementary European Search Report—EP20744681—Search Authority—Munich—dated Oct. 11, 2022.

* cited by examiner

400

| BWP size (RBs) | Subband size (RBs) |
|---|---|
| < 24 | N/A |
| 24 - 72 | 4, 8 |
| 73 - 144 8, 16 | 8, 16 |
| 145 - 275 | 16, 32 |

FIG. 4

CSI computation delay

| $\mu$ | $Z_1$ [symbols] ||
|---|---|---|
| | $Z_1$ | $Z'_1$ |
| 0 | 10 | 8 |
| 1 | 13 | 11 |
| 2 | 25 | 21 |
| 3 | 43 | 36 |

FIG. 8

| μ | $Z_1$ [symbols] | | $Z_2$ [symbols] | | $Z_3$ [symbols] | |
|---|---|---|---|---|---|---|
| | $Z_1$ | $Z'_1$ | $Z_2$ | $Z'_2$ | $Z_3$ | |
| 0 | 22 | 16 | 40 | 37 | 22 | $X_1$ |
| 1 | 33 | 30 | 72 | 69 | 33 | $X_2$ |
| 2 | 44 | 42 | 141 | 140 | $\min(44, X_3 + KB_1)$ | $X_3$ |
| 3 | 97 | 85 | 152 | 140 | $\min(97, X_4 + KB_2)$ | $X_4$ |

CSI computation delay

FIG. 9

CSI PROCESSING FOR FINE CSI GRANULARITY

CROSS-REFERENCE TO RELATED APPLICATION(S)

This application is a national stage application under 35 U.S.C. 371 of PCT/CN2020/073709, filed Jan. 22, 2020, which claims benefit of and priority to International Application No. PCT/CN2019/072625, filed Jan. 22, 2019, which are both assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for channel state information (CSI) processing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) reporting configuration. The CSI reporting configuration includes a number of frequency domain (FD) units and a FD unit size for CSI reporting. The method generally includes determining a number of CSI processing units at the UE, at least one time threshold for CSI processing, or both, to use for processing the CSI report based on the number of FD units or the FD unit size. The method generally includes processing the CSI report based on the determination.

Certain aspects provide another method for wireless communication by a base station (BS). The method generally includes configuring a UE with a CSI reporting configuration. The CSI reporting configuration includes a number of FD units and a FD unit size for CSI reporting based on a number of CSI processing units at the UE, at least one time threshold for CSI processing, or both. The method generally includes receiving the CSI report from the UE based on the configuration.

Certain aspects provide an apparatus for wireless communication. The apparatus generally includes a memory and at least one processor coupled with the memory. The at least one processor is generally configured to receive a CSI reporting configuration. The CSI reporting configuration includes a number of FD units and a FD unit size for CSI reporting. The at least one processor is generally configured to determine a number of CSI processing units at the apparatus, at least one time threshold for CSI processing, or both, to use for processing the CSI report based on the number of FD units or the FD unit size. The at least one processor is generally configured to process the CSI report based on the determination.

Certain aspects provide an apparatus for wireless communication. The apparatus generally includes a memory and at least one processor coupled with the memory. The at least one processor is generally configured to configure a UE with a CSI reporting configuration. The CSI reporting configuration includes a number of FD units and a FD unit size for CSI reporting based on a number of CSI processing units at the UE, at least one time threshold for CSI processing, or both. The at least one processor is generally configured to receive the CSI report from the UE based on the configuration.

Certain aspects provide an apparatus for wireless communication. The apparatus generally includes means for receiving a CSI reporting configuration. The CSI reporting configuration includes a number of FD units and a FD unit size for CSI reporting. The apparatus generally includes determining a number of CSI processing units at the apparatus, at least one time threshold for CSI processing, or both, to use for processing the CSI report based on the number of FD units or the FD unit size. The apparatus generally includes means for processing the CSI report based on the determination.

Certain aspects provide an apparatus for wireless communication. The apparatus generally includes means for configuring a UE with a CSI reporting configuration. The CSI reporting configuration includes a number of FD units and a FD unit size for CSI reporting based on a number of CSI processing units at the UE, at least one time threshold for CSI processing, or both. The apparatus generally includes means for receive the CSI report from the UE based on the configuration.

Certain aspects provide a computer readable medium storing computer executable code thereon for wireless communication. The computer executable code generally includes code for receiving a CSI reporting configuration. The CSI reporting configuration includes a number of FD units and a FD unit size for CSI reporting. The computer executable code generally includes code for determining a number of CSI processing units at a UE, at least one time threshold for CSI processing, or both, to use for processing the CSI report based on the number of FD units or the FD unit size. The computer executable code generally includes code for processing the CSI report based on the determination.

Certain aspects provide a computer readable medium storing computer executable code thereon for wireless communication. The computer executable code generally includes code for configuring a UE with a CSI reporting configuration. The CSI reporting configuration includes a number of FD units and a FD unit size for CSI reporting based on a number of CSI processing units at the UE, at least one time threshold for CSI processing, or both. The computer readable medium generally includes code for receive the CSI report from the UE based on the configuration.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 is an example table showing subband sizes for bandwidth parts (BWPs), in accordance with certain aspects of the present disclosure.

FIG. 8 is a table showing example CSI computation delay thresholds, in accordance with certain aspects of the present disclosure.

FIG. 9 is another table showing example CSI computation delay thresholds, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
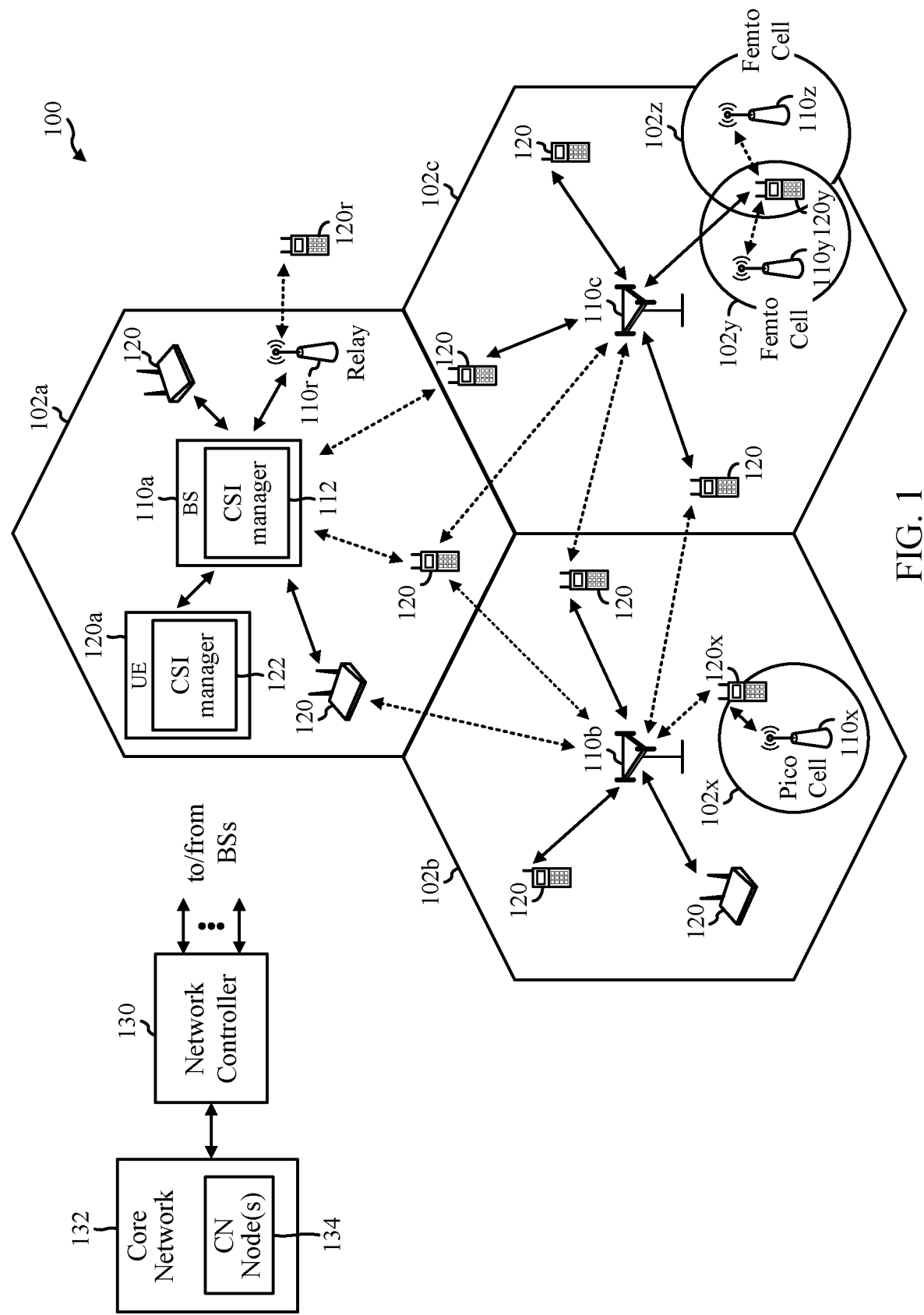
FIG. 1 is a block diagram conceptually illustrating an example telecommunications system, in accordance with certain aspects of the present disclosure.

Aspects of the present disclosure provide apparatus, methods, processing systems, and computer readable mediums for channel state information (CSI) processing, for example for processing fine granularity CSI, such as sub-band precoder matrix indicator (PMI) feedback.

In certain systems (e.g., such Release-16 5G NR systems), a fine granularity is used for PMI feedback (e.g., a small one resource block (RB)) to enhance performance of the CSI report. The fine granularity may lead to large CSI overhead due to a larger number of frequency units (e.g., subbands) to report and, therefore, lead to larger CSI computation complexity. Therefore, techniques are desirable for more efficient CSI reporting which may save battery life.

In some cases, CSI configurations (and therefore also the CSI reports) with the finer PMI granularity may be limited. According to certain aspects of the present disclosure, the number of CSI processing units used at the user equipment (UE) for CSI processing can be based on the number of frequency units the UE is configured to report CSI. Additionally or alternatively, the CSI processing timeline can be based on the number of configured frequency units. For example, a larger timing threshold may be used for updating CSI report when fine frequency unit size is configured for the CSI reporting.

The following description provides examples of CSI processing for fine granularity CSI, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed for channel state information (CSI) processing for fine granularity precoding matrix information (PMI). For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs (e.g., via a backhaul).

The BSs 110 communicate with UEs 120a-y (each also individually referred to herein as UE 120 or collectively as UEs 120) in the wireless communication network 100. The UEs 120 may be stationary or mobile. Wireless communication network 100 may also include relay stations (e.g., relay station 110r), also referred to as relays or the link, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for CSI reporting. As shown in FIG. 1, the UE 120a in the wireless communication network 100 includes a CSI manager 122. The CSI manager 122 may be configured to receive a CSI reporting configuration, for example from the BS 110a in the wireless communication network 100. The CSI reporting configuration may include a number of frequency domain (FD) units and a FD unit size for CSI reporting. The CSI manager 122 may be configured to determine a number of CSI processing units at the UE 120a and/or a CSI processing time threshold to use for processing the CSI report based on the configured number of FD units or the FD unit size for the CSI report. The UE 120 processes the CSI report based on the determined number CSI processing units and/or CSI processing time threshold. As shown in FIG. 1, the BS 110a includes a CSI manager 112. The CSI manager 112 may be configured for CSI processing in accordance with aspects of the present disclosure.

Figure 2:
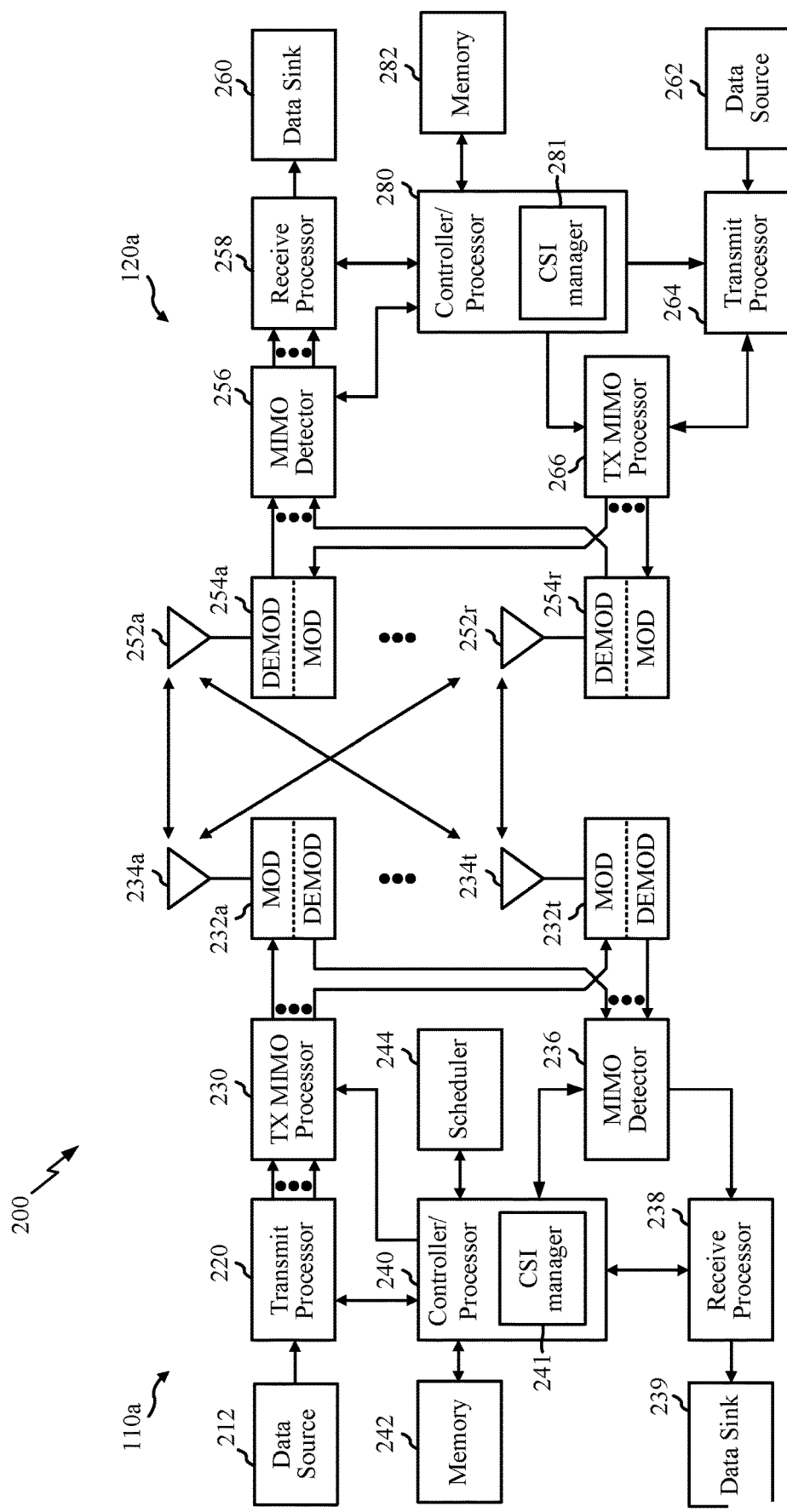
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and CSI reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for CSI processing for fine granularity PMI. For example, as shown in FIG. 2, the controller/processor 240 of the BS 110a has a CSI manager 241 that may be configured for CSI processing for fine granularity, according to aspects described herein. As shown in FIG. 2, the controller/processor 280 of the UE 120a has CSI manager 281 that may be configured for CSI processing for fine granularity, according to aspects described herein. The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) and/or uplink and single-carrier frequency division multiplexing (SC-FDM). NR may support half-duplex operations using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. NR may support a base subcarrier spacing (SCS) of 15 kHz and other SCS may be defined with respect to the base SCS (e.g., 30 kHz, 60 kHz, 120 kHz, 240 kHz, etc.).

Figure 3:
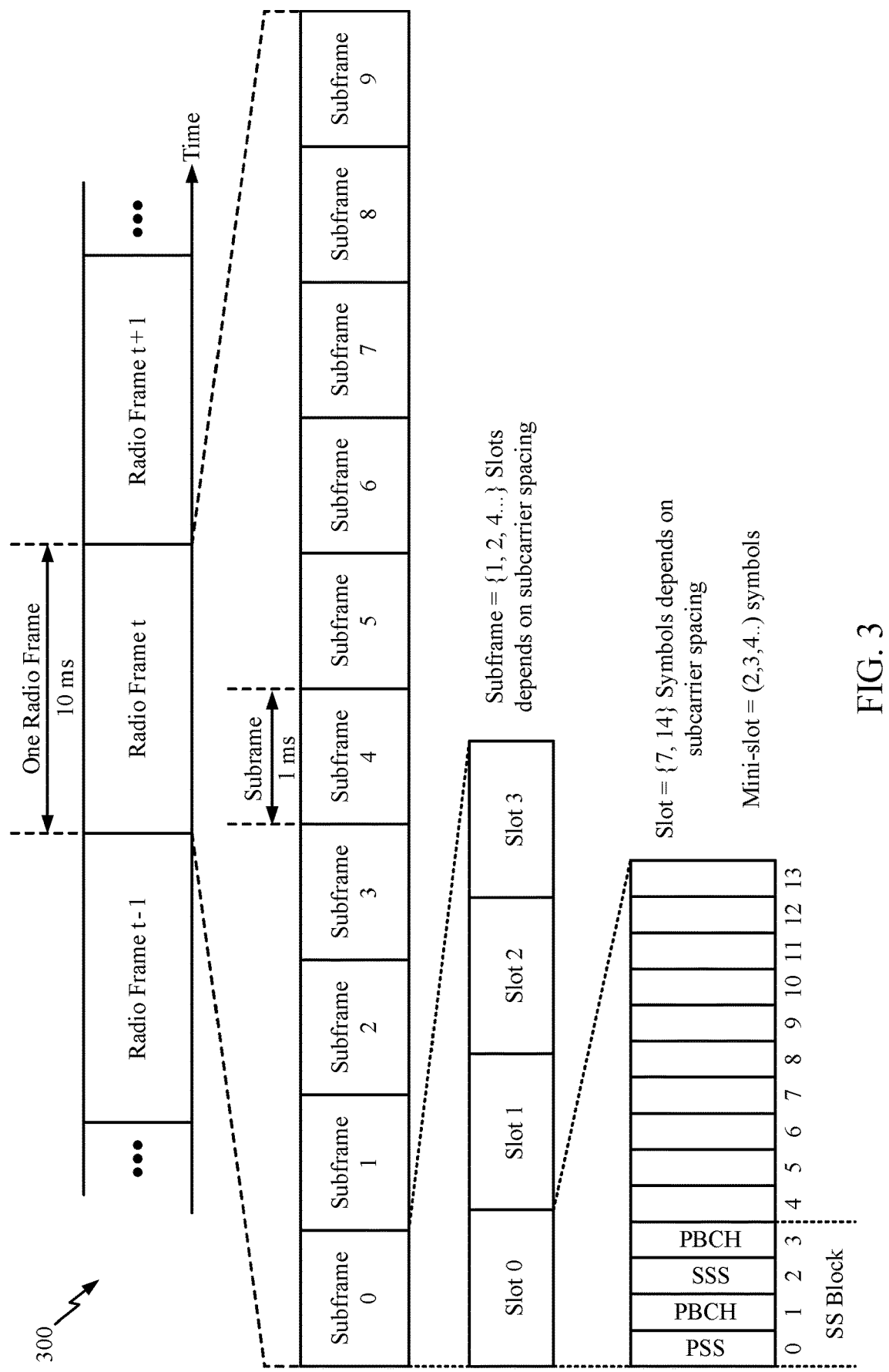
FIG. 3 illustrates an example of a frame format for a new radio (NR) system, in accordance with certain aspects of the present disclosure.

In NR, a subframe is still 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by the BS (e.g., a gNB). CSI may include of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP.

The network (e.g., the BS 110a), may configure UEs (e.g., the UE 120a) for CSI reporting. For example, the BS may configure the UE with a CSI report configuration or with multiple CSI report configurations. The CSI report configuration may be provided to the UE via higher layer signaling, such as radio resource control (RRC) signaling (e.g., a higher layer CSI-ReportConfig parameter). The CSI report configuration may be associated with CSI-RS resources for channel measurement (CM), interference measurement (IM), or both. The CSI report configuration configures CSI-RS resources for measurement (e.g., a higher layer CSI-ResourceConfig parameter). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include the CQI, PMI, CRI, and/or RI. The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., higher layer CSI-Aperiodic TriggerStateList and CSI-SemiPersistentOnPUSCH-TriggerStateList parameters). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

In certain systems (e.g., Release 15 5G NR), the UE may be configured for spatial domain compressed CSI reporting. For example, the UE may be configured to report at least a Type II precoder across configured frequency units:

$$w_r = \sum_{i=0}^{2L-1} b_i \cdot c_i, \text{ where } c_i = \underbrace{[c_{i,0} \cdots c_{i,N_3-1}]}_{N_3},$$

where $b_i$ is the selected beam, $c_i$ is the set of linear combination coefficients, L is the number of selected spatial beams, and $N_3$ corresponds to the number of frequency units (e.g., subbands, resource blocks (RBs), etc.).

In certain systems (e.g., Rel-16 5G NR), the UE may be configured to report spatially and frequency domain compressed precoder feedback:

$$w_r = \sum_{i=0}^{2L-1} b_i \cdot \tilde{c}_i \cdot F_i^H,$$

where the discrete Fourier transform (DFT) compression basis is given by:

$$F_i^H = \begin{bmatrix} f_{i,0}^H \\ f_{i,1}^H \\ \vdots \\ f_{i,N_3-1}^H \end{bmatrix} \text{ of size } M_i \times N_3,$$

and where $M_i$ is dimension of the compressed domain. The coefficients are given by:

$$\tilde{c}_i = \underbrace{[c_{i,0} \cdots c_{i,M_i-1}]}_{M_i},$$

and the dimension of the compressed domain is $M_i < N_3$.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., a higher layer bwp-Id parameter) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems (e.g., Rel-15 5G NR) for CSI reporting, the UE can be configured via higher layer signaling (e.g., in the CSI report configuration) with one out of two possible subband sizes (e.g., the higher layer reportFreqConfiguration parameter contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. For example, the Table 400 illustrated in FIG. 4 shows subbands sizes associated with BWPs.

In certain systems, a finer granularity is used for CSI. For example, a subband size for PMI may smaller than the subband sizes shown in FIG. 4. The finer CSI granularity may lead to larger CSI computation complexity than for the larger CSI granularities. For example, the UE may compute CSI for an increased number of FD units. Therefore, techniques to improve UE computation efficiency and save battery life, for CSI configurations with fine PMI granularity, are desirable.

Example CSI Processing For Fine Granularity CSI

According to certain aspects, a number of channel state information (CSI) processing units at a user equipment (UE) that are used for the CSI reporting is based on the number of frequency domain (FD) units and/or FD unit size configured for the CSI reporting. In some examples, more CSI processing units at the UE may be used when the finer granularity CSI is configured. According to certain aspects, the CSI processing timeline (e.g., one or more CIS processing time thresholds) is based on the number of FD units and/or FD unit size for CSI reporting. In some examples, a longer CSI processing timeline may be used when fine granularity CSI is configured.

Figure 5:
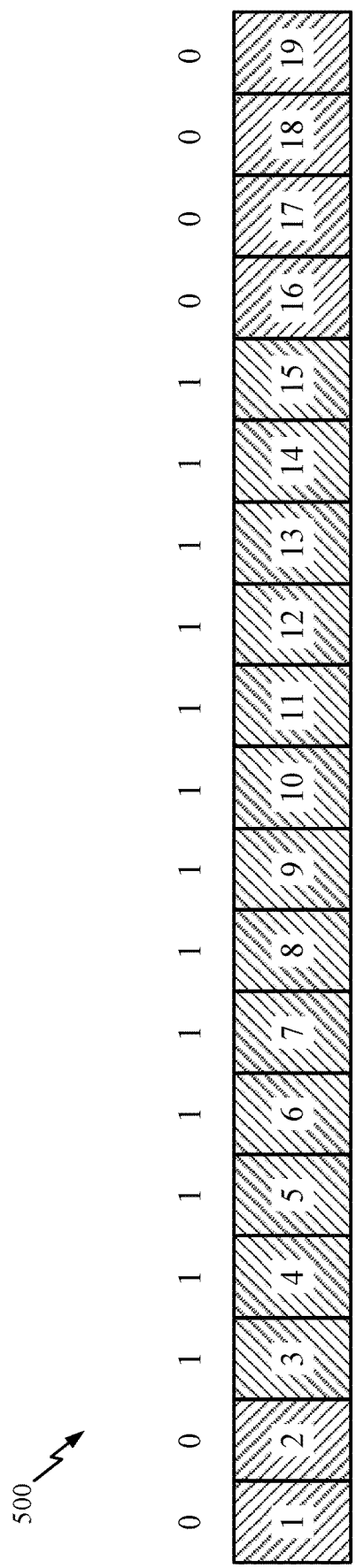
FIG. 5 shows example subbands configured for channel state information (CSI) reporting, in accordance with certain aspects of the present disclosure.

According to certain aspects, the UE may be configured to report subband precoder information, such as precoding matrix indicator (PMI). As discussed above, the CSI configuration may be associated with a bandwidth part (BWP) and the BWP may be associated with a bandwidth size and subband size. The UE may further receive an indication of the subbands for which the CSI feedback is requested. FIG. 5 shows example subbands configured (e.g., requested) for CSI reporting, in accordance with certain aspects of the present disclosure. In the example in FIG. 5, thirteen of the nineteen total subbands (subbands 3, 4, . . . , 15) are requested for CSI reporting. In some examples, a subband mask is used to indicate the requested subbands for CSI reporting. The UE computes precoders for each requested subband and finds the PMI that matches the computed precoder on each of the subbands.

According to certain aspects, the CSI granularity (e.g., the PMI) spans a number of RBs (e.g., x RBs). As discussed above, the FD unit size may be a fine granularity. The granularity of the FD units may refer to the number of one or more RBs for which the UE is configured to report a single PMI. In some examples, the FD unit size may be smaller than the sizes shown in FIG. 4 for the associated BWPs. In some examples, granularity may be as small as 1 RB. In some examples, the PMI granularity may be smaller than a channel quality indicator (CQI) granularity. For example, the PMI granularity may be:

$x$=(CQI subband size)/$R$, where $R>1$ is a predefined integer. Thus, the number of FD units (e.g., the number of subbands) may be up to the total number of configured subbands*R (e.g., 19R).

According to certain aspects, the number of CSI processing units may be based on the number of FD units or FD unit size for the CSI reporting. For example, the number of CSI processing units at the UE used for the CSI computing may be increased when the granularity if fine and the total number of FD units is high, whereas a fewer number of CSI processing units may be used at the UE when the FD unit size is larger and the total number of FD units to report is lower. Additionally or alternatively, one or more CSI processing time thresholds may be based on the PMI granularity.

Figure 6:
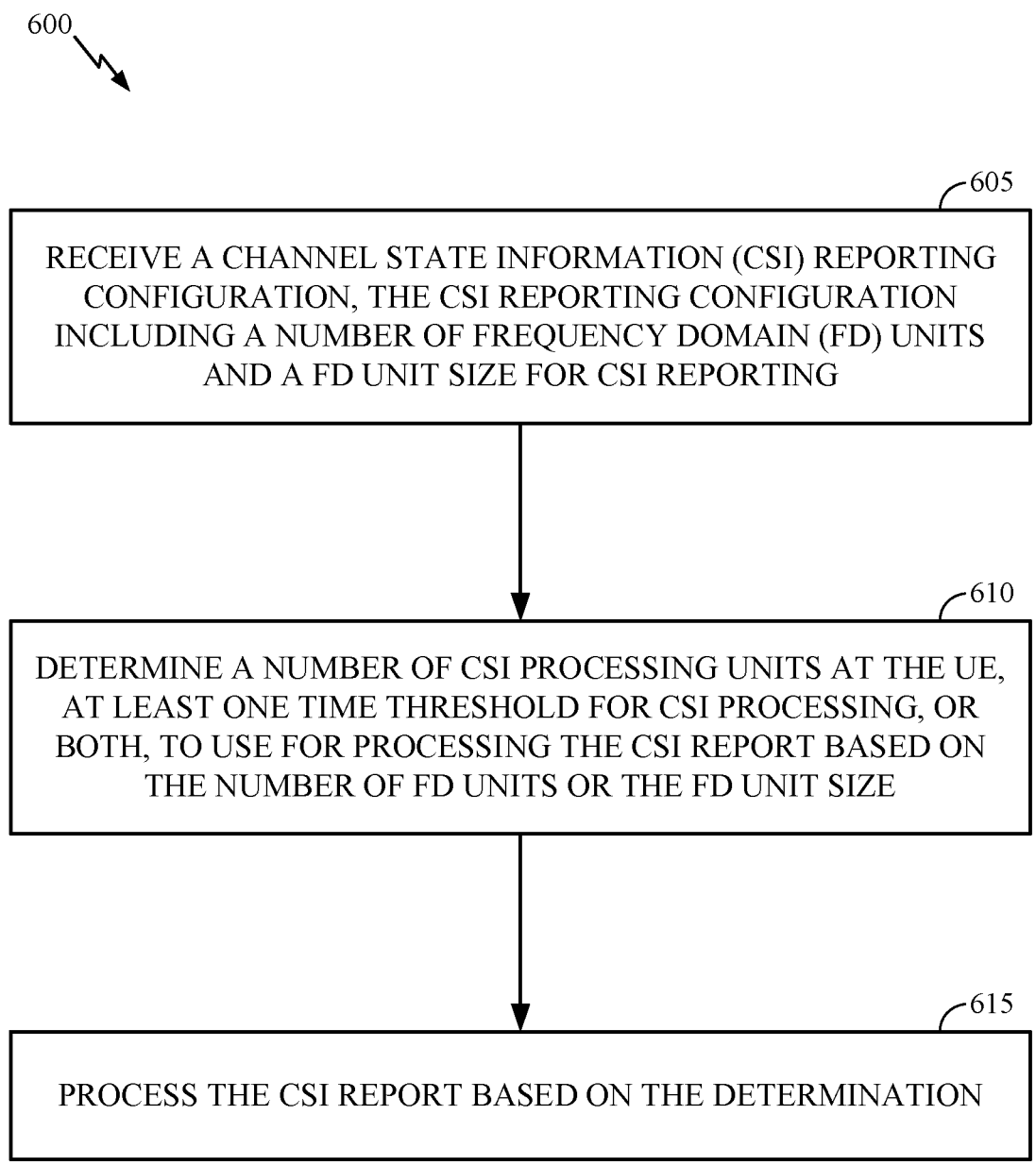
FIG. 6 is a flow diagram illustrating example operations by a user equipment (UE) for CSI processing, in accordance with certain aspects of the present disclosure.

FIG. 6 is a flow diagram illustrating example operations 600 for wireless communication. The operations 600 may be performed, for example, by UE (e.g., such as a UE 120a in the wireless communication network 100) for CSI processing, in accordance with certain aspects of the present disclosure. Operations 600 may be implemented as software components that are executed and run on one or more processors (e.g., processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 600 may begin, at 605, by receiving a CSI reporting configuration. The CSI reporting configuration includes a number of FD units and a FD unit size for CSI reporting. In some examples, the CSI reporting configuration configures the UE for reporting subband PMI. In some examples, the number of FD units and the FD unit size is based on the BWP associated with the CSI reporting configuration. In some examples, the FD unit is a subband. In some examples, the FD unit size corresponds a number of RBs contained in one FD unit.

At 610, the UE determines a number of CSI processing units at the UE, at least one time threshold for CSI processing, or both, to use for processing the CSI report. The number of CSI processing units and/or the at least one time threshold for CSI processing are based on the number of FD units or the FD unit size for the CSI report.

At 615, the UE processes the CSI report based on the determination.

According to certain aspects, the UE may receive a request for CSI reporting for at least a portion of the number of FD units. In some examples, the request may be an FD mask. For example, the FD mask may be a bitmap with length equal to the total number of configured FD units (e.g., associated with the BWP size). The bitmap may have "1's" indicating requested FD units. The number of "1"s in the bitmap corresponds to the number of FD units for a CSI report. In some examples, the request may include a CQI subband mask and an indication of the R FD units per subband. The CQI subband mask may be a bitmap with a length equal to the number of subbands, with "1's" in the bitmap corresponding to the number of subbands required for the CQI report, and the number of FD units is equal to R multiplied by the number of CQI subbands required for a CQI report.

Processing the CSI mau include computing the CSI using the determined number of CSI processing units. The CSI report configuration occupies a number of CSI processing units ($O_{CPU}$). The UE may support a number of simultaneous CSI calculations $N_{CPU}$. If the UE supports $N_{CPU}$ simultaneous CSI calculations, the UE is said to have $N_{CPU}$ CSI processing units for processing CSI reports across all configured cells. If there are more CSI report configurations requiring more than $N_{CPU}$ CPUs, the UE may decide to drop some of the CSI reports so as to satisfy the capability of supporting max $N_{CPU}$ CSI calculations.

In certain systems (e.g., Rel-15 5G NR), $O_{CPU}$ is based on the configured report quantity. For example, $O_{CPU}=0$ for report quantity "none" and CSI-RS-ResourceSet with higher layer parameter trs-Info configured; $O_{CPU}=1$ for a CSI report quantity "cri-RSRP", "ssb-Index-RSRP" or none; and $O_{CPU}=N_{CPU}$ ($N_{CPU}$ as UE capability of total number of CPUs) for wideband CSI with up to 4 ports without CRI report; otherwise, $O_{CPU}=K_s$, where $K_s$ denotes the number of CSI-RS resources configured for channel measurement.

According to certain aspects of the present disclosure, the UE determines the number CSI processing units ($O_{CPU}$) to use based on the determined number of FD units for the CSI report.

In some examples, the UE can determine a first number of CSI processing units to use when the number of FD units for reporting CSI is equal to or below a first threshold or when the FD unit size for reporting CSI is equal to or larger than a second threshold (e.g., the FD unit size may correspond to the number of FD units for reporting). The UE may determine a second number of CSI processing units to use when the number of FD units for reporting precoder information feedback is above the first threshold (e.g., greater than the total number of CQI subbands contained in the BWP) or when the FD unit size for reporting CSI is below the second threshold (e.g., smaller than the CQI subband size).

In some examples, for a CSI report with a number of PMI subbands equal or below a threshold (e.g., 19 subbands), then $O_{CPU}=K_s$ and for a CSI report with the number of PMI subbands greater than the threshold, then a larger number of CSI processing units may be used, for example, equal to the first number of CSI processing units multiplied by an integer greater than one ($O_{CPU}=O*K_s$, where O>1). The integer O can be determined based on the number of FD unit for CSI report and/or or the FD unit size. In some examples, the integer O is determined based on at the ratio of the number of FD units for CSI report to the first threshold and/or the ratio of the second threshold to the FD unit size. In some examples, the CSI report configuration configures one or more CSI-RS resources for channel measurement. The first and second number of CSI processing units may scale with the number of CSI-RS resources configured for channel measurement.

Figure 7:
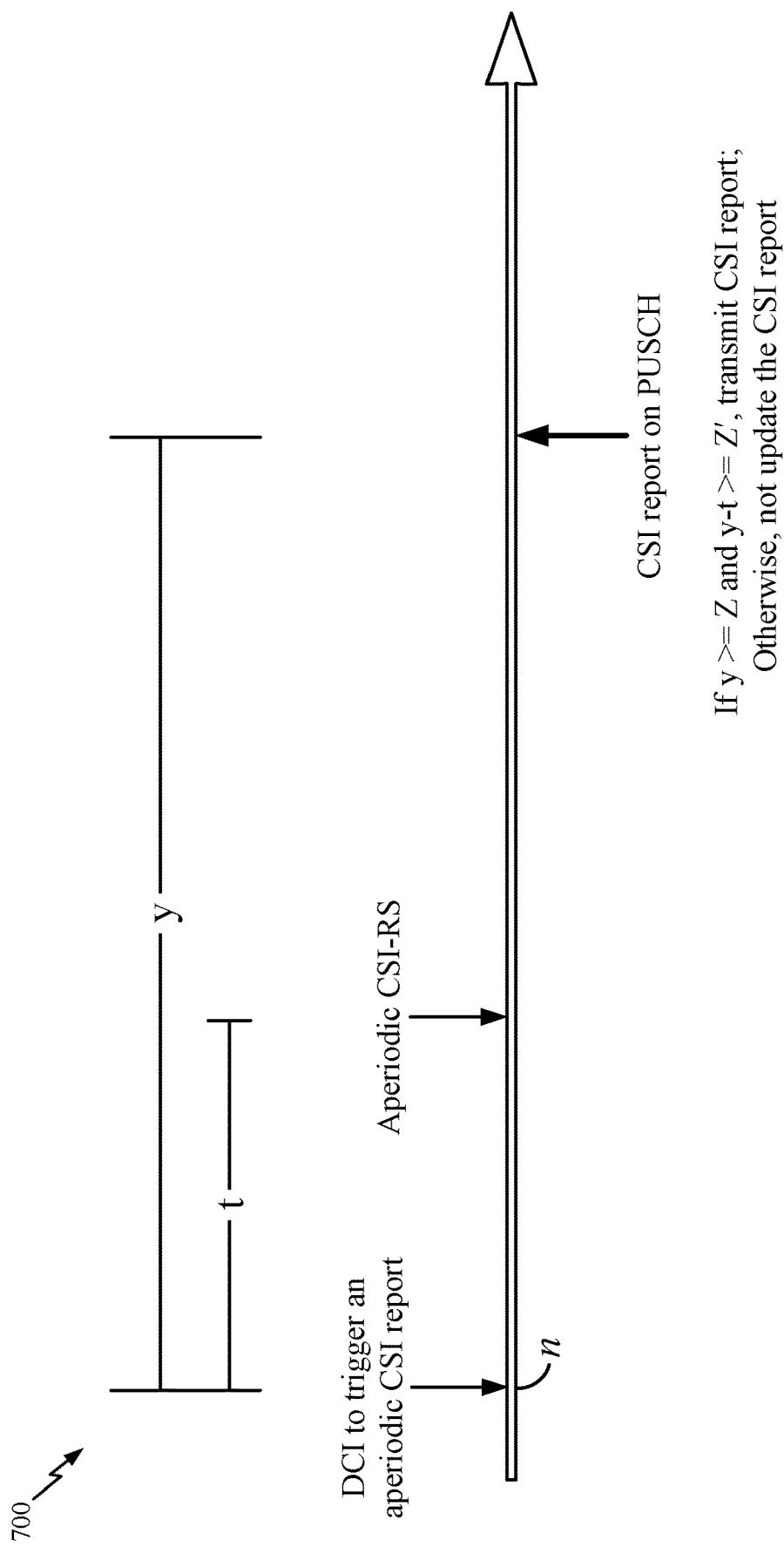
FIG. 7 is an example CSI reporting timeline, in accordance with certain aspects of the present disclosure.

According to certain aspects, the CSI reporting timeline (e.g., the at least one time threshold for CSI processing) may be based on the number of FD units or FD unit size for CSI reporting. FIG. 7 is an example CSI reporting timeline 700, in accordance with certain aspects of the present disclosure. As shown in FIG. 7, after receiving the CSI report configuration, the UE may receive a downlink control information (DCI) triggering the CSI reporting. For example, the DCI may be received in a slot n. The DCI trigger may activate a CSI-RS resource the UE monitors for CSI-RS (e.g., aperiodic CSI-RS). After a duration of t slots, the UE receives the associated CSI-RS in slot n+t. The UE computes the CSI based on the received CSI-RS and determines whether to sends the CSI report (e.g., an aperiodic CSI report) or whether to not update the CSI report, based on the delay, y, between when the DCI trigger is received (in slot n) and computing and preparing the CSI report for sending (in the slot n+y) and/or a delay between when the CSI is received and the CSI report (y−t).

In some examples, the UE is configured with one or more time thresholds for CSI reporting. If the delay y is equal to or greater than a first time threshold Z and the the delay y−t is equal or greater than a second threshold Z' then the UE transmits the CSI report; otherwise, the UE does not update the CSI reports (e.g., transmits a non-updated CSI report or "garbage" CSI report). The Tables 800 and 900 in FIG. 8 and FIG. 9 illustrate example thresholds. The first threshold, Z, may define a minimum number of symbols between the DCI triggering the CSI report and the transmission of the CSI report. The second thresholds, Z', may define a minimum number of symbols between the associated CSI-RS transmission and transmission of the CSI report.

According to certain aspects, the thresholds used may be based on the number of FD units or the FD unit size for the CSI report. In some examples, a larger threshold is introduced (e.g., a $Z_4$ threshold), such as larger than the thresholds shown in the Tables 800 and 900 ($Z_1$, $Z_2$, and $Z_3$). The additional larger threshold $Z_4$ may be used for fine granularity CSI reporting.

According to certain aspects, the UE determines a first set of thresholds to use when the number of FD units for reporting CSI is equal to or below a threshold and a second set of thresholds to use when the number of FD units for reporting CSI is above the threshold. In some examples, the first and second sets of thresholds each includes one or more thresholds Z for a minimum number of symbols between reception of DCI triggering CSI reporting and transmission of the CSI report and one or more thresholds Z' for a minimum number of symbols between reception of CSI-RS and transmission of the CSI report. For example, if y≥Z and y−t≥Z, then the UE updates the CSI report. If y≤Z or y−t≤Z', then the UE does not update the CSI report.

According to certain aspects, each of the second set of thresholds is greater than each of the first set of thresholds. For example, the first set of thresholds may include the Z and Z' thresholds shown in Tables 800 and 900. The second set of thresholds may include larger $Z_4$ and $Z_4'$ thresholds. According to certain aspects, the threshold may be equal to the number of CQI subbands.

Figure 10:
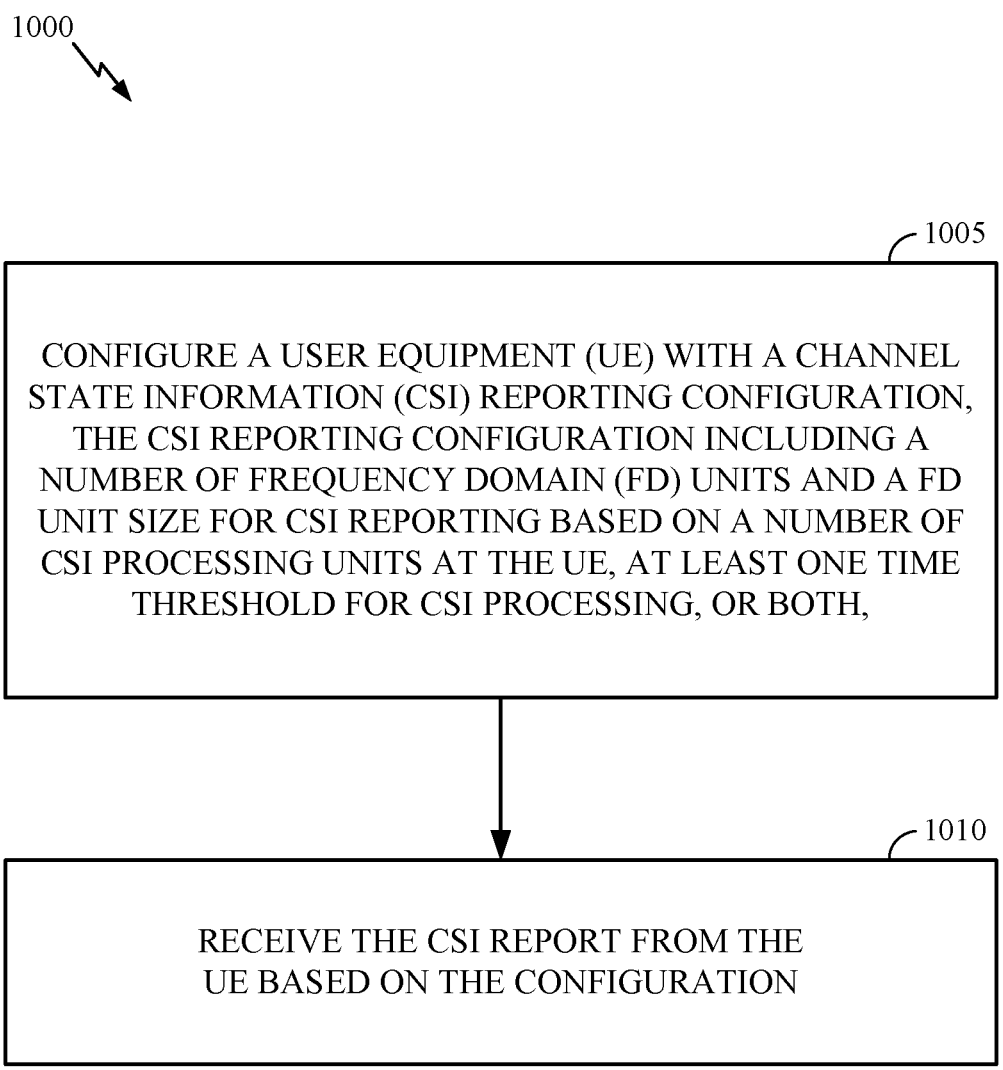
FIG. 10 is a flow diagram illustrating example operations by a BS, in accordance with certain aspects of the present disclosure.

A BS (e.g., such as a BS 110 in the wireless communication network 100) may perform complimentary operations by the BS the operations 600 performed by the UE. FIG. 10 is a flow diagram illustrating example operations 1000 for wireless communication. The operations 1000 may be performed, for example, by UE (e.g., such as a UE 120 in the wireless communication network 100) for CSI processing, in accordance with certain aspects of the present disclosure. Operations 1000 may be implemented as software components that are executed and run on one or more processors (e.g., processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 1000 may begin, at 1005, by configuring a UE with a CSI reporting configuration. The CSI reporting configuration including a number of FD units and a FD unit size for CSI reporting based on a number of CSI processing units at the UE, at least one time threshold for CSI processing, or both. For example, the BS may be restricted to configuring the UE with the number of FD units and FD units such that the computation can be supported by the number of CSI processing units at the UE and/or the time threshold for CSI processing. At 1010, the BS receives the CSI report from the UE based on the configuration.

Figure 11:
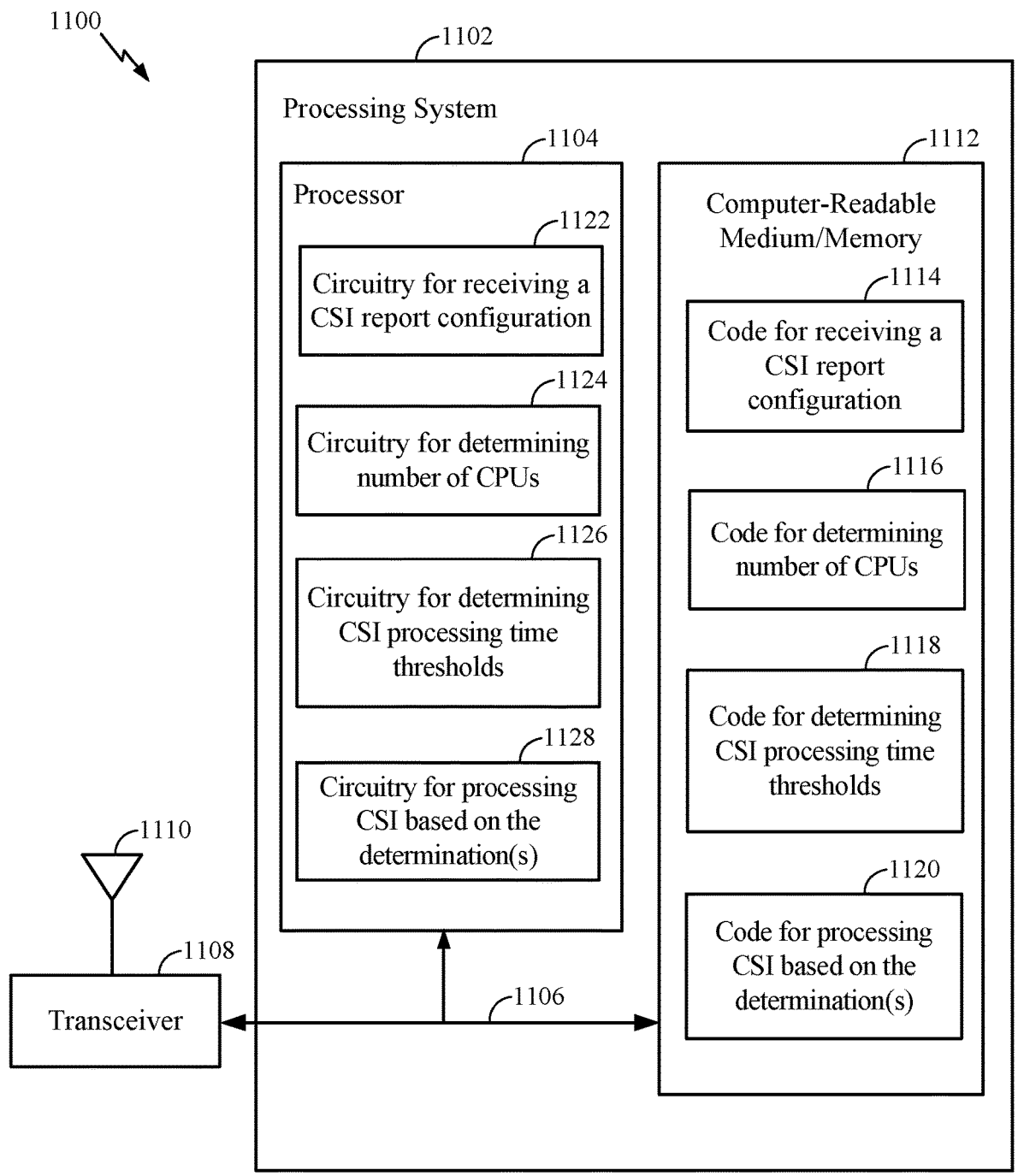
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein for CSI processing for CSI with fine granularity. In certain aspects, computer-readable medium/memory 1112 stores code 1114 for receiving a CSI report configuration; code 1116 for determining a number of CSI processing units (CPUs) to use for the CSI report based on the number of FD units or FD unit size for the CSI report; code 1118 for determining the CSI processing time thresholds based on the number of FD units or FD unit size for the CSI report; and/or code 1120 for processing the CSI report based on the determination(s). In certain aspects, the processor 1104 has circuitry configured to implement the code stored in the computer-readable medium/memory 1112. The processor 1104 includes circuitry 1122 for receiving a CSI report configuration; circuitry 1124 for determining a number of CPUs to use for the CSI report based on the number of FD units or FD unit size for the CSI report; circuitry 1126 for determining CSI processing time thresholds based on the number of FD units or FD unit size for the CSI report; and/or circuitry 1428 for processing the CSI report based on the determination(s).

Figure 12:
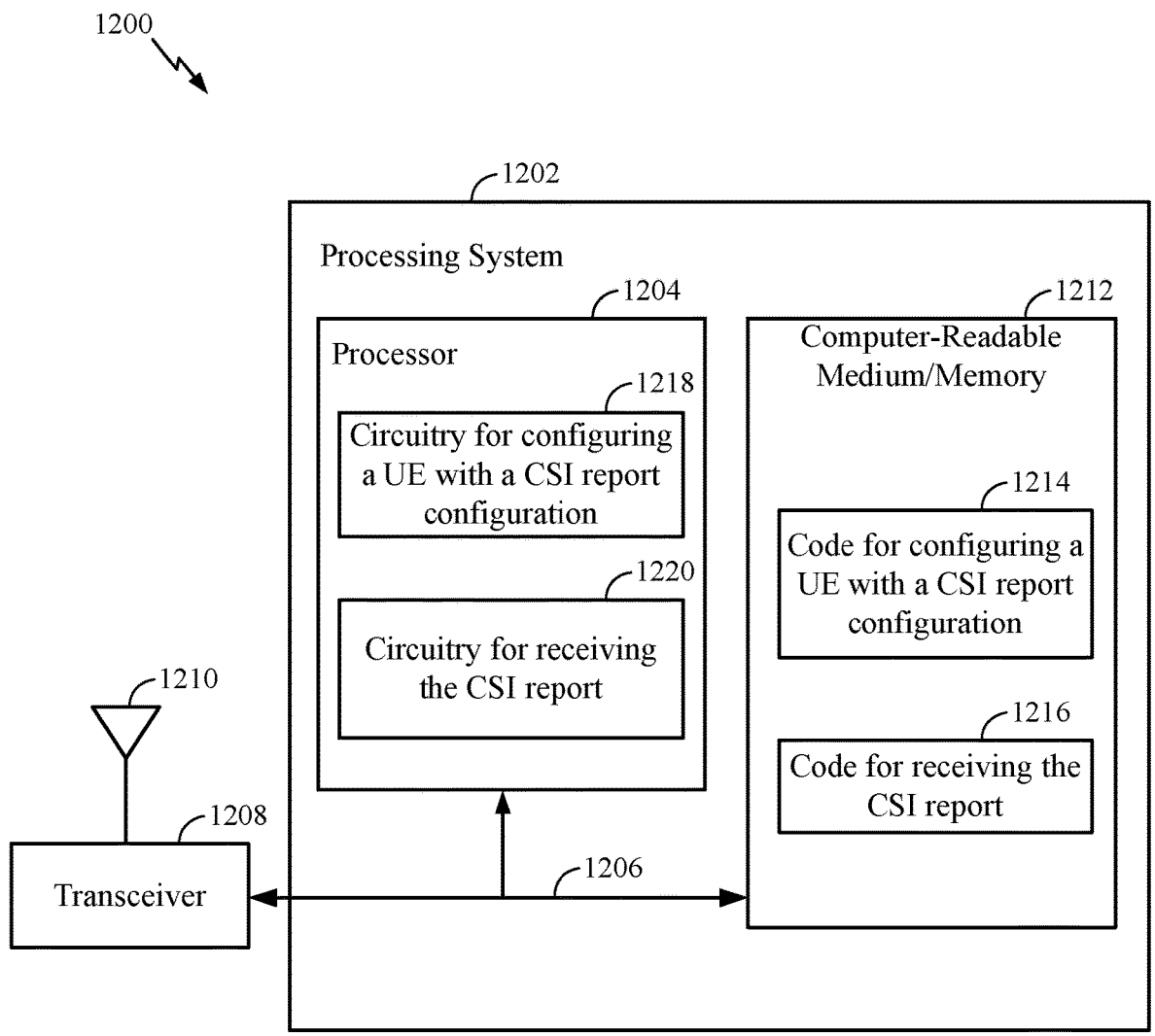
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for CSI processing for CSI with fine granularity. In certain aspects, computer-readable medium/memory 1212 stores code 1214 for configuring a UE with a CSI report configuration; and/or code 1216 for receiving the CSI report. In certain aspects, the processor 1204 has circuitry configured to implement the code stored in the computer-readable medium/memory 1212. The processor 1204 includes circuitry 1218 for configuring a UE with a CSI report configuration; and/or circuitry 1220 for receiving the CSI report based on the determination(s).

Example Aspects

In a first aspect, a method for wireless communications by a user equipment (UE) includes receiving a channel state information (CSI) reporting configuration. The CSI reporting configuration includes a number of frequency domain (FD) units and a FD unit size for CSI reporting. The UE determines a number of CSI processing units at the UE, at least one time threshold for CSI processing, or both, to use for processing the CSI report based on the number of FD units or the FD unit size. The UE processes the CSI report based on the determination.

In a second aspect, in combination with the first aspect, the CSI includes compressed subband precoding matrix indicator (PMI) feedback.

In a third aspect, in combination with one or more of the first and second aspects, an FD unit includes a subband.

In a fourth aspect, in combination with one or more of the first through third aspects, the CSI includes at least precoder information feedback and channel quality indicator (CQI) feedback; the FD unit size for the precoder information feedback is determined based on a subband size for the CQI divided by a predefined integer; and the UE determines a total number of FD units as a total number of subbands for the CQI multiplied by the predefined integer.

In a fifth aspect, in combination with one or more of the first through fourth aspects, processing the CSI report based on the determination includes computing the CSI using the determined number of CSI processing units.

In a sixth aspect, in combination with one or more of the first through fifth aspects, determining the number of CSI processing units to use includes determining a first number of CSI processing units to use when the number of FD units for reporting CSI is equal to or below a first threshold, or when the FD unit size for reporting CSI is equal to or larger than a second threshold; and determining a second number of CSI processing units to use when the number of FD units for reporting precoder information feedback is above the first threshold, or when the FD unit size for reporting CSI is below the second threshold.

In a seventh aspect, in combination with one or more of the first through sixth aspects, the second number of CSI processing units is equal to the first number of CSI processing units multiplied by an integer.

In an eighth aspect, in combination with one or more of the first through seventh aspects, the UE determines the integer based on at least one of: the number of FD units for CSI reporting or the FD unit size.

In a ninth aspect, in combination with one or more of the first through third eighth aspects, the UE determines the integer based on at least one of: a ratio of the number of FD units for CSI reporting to the first threshold or a ratio of the second threshold to the FD unit size.

In a tenth aspect, in combination with one or more of the first through ninth aspects, the first threshold includes the total number of CQI subband contained in a bandwidth part (BWP) and/or the second threshold is equal to the CQI subband size.

In an eleventh aspect, in combination with one or more of the first through tenth aspects, the CSI report configuration configures one or more CSI reference signal (CSI-RS) resources for channel measurement and the first and second number of CSI processing units scales with the number of CSI-RS resources configured for channel measurement.

In a twelfth aspect, in combination with one or more of the first through eleventh aspects, determining the at least one time threshold to use includes determining a first set of time thresholds to use when the number of FD units for reporting CSI is equal to or below a threshold; and determining a second set of time thresholds to use when the number of FD units for reporting CSI is above the threshold.

In a thirteenth aspect, in combination with one or more of the first through twelfth aspects, each of the second set of time thresholds is greater than each of the first set of time thresholds.

In a fourteenth aspect, in combination with one or more of the first through thirteenth aspects, the first and second sets of time thresholds each includes one or more first time thresholds for a minimum timing between reception of downlink control information (DCI) triggering CSI reporting and transmission of the CSI report; and one or more second time thresholds for a minimum timing between reception of CSI reference signals (CSI-RS) and transmission of the CSI report.

In a fifteenth aspect, in combination with one or more of the first through fourteenth aspects, determining whether to update the CSI report includes updating the CSI report when the both of the determined first and second time thresholds are satisfied; and sending a non-updated CSI report when at least one of first and second time thresholds are not satisfied.

In a sixteenth aspect, a method for wireless communications by a base station (BS) includes configuring a user equipment (UE) with a channel state information (CSI) reporting configuration. The CSI reporting configuration including a number of frequency domain (FD) units and a FD unit size for CSI reporting based on a number of CSI processing units at the UE, at least one time threshold for CSI processing, or both. The BS receives the CSI report from the UE based on the configuration.

In a seventeenth aspect, in combination with the sixteenth aspect, the CSI includes compressed subband precoding matrix indicator (PMI) feedback.

In an eighteenth aspect, in combination with one or more of the sixteenth and seventeenth aspects, the CSI includes at least precoder information feedback and channel quality indicator (CQI) feedback; the FD unit size for the precoder information feedback is determined based on a subband size for the CQI divided by a predefined integer; and the BS determines a total number of FD units as a total number of subbands for the CQI multiplied by the predefined integer.

In a nineteenth aspect, in combination with one or more of the sixteenth through eighteenth aspects, determining the number of CSI processing units includes determining a first number of CSI processing units when the number of FD units for reporting CSI is equal to or below a first threshold, or when the FD unit size for reporting CSI is equal to or larger than a second threshold; and determining a second number of CSI processing units when the number of FD units for reporting precoder information feedback is above the first threshold, or when the FD unit size for reporting CSI is below the second threshold.

In a twentieth aspect, in combination with one or more of the sixteenth through nineteenth aspects, the second number of CSI processing units is equal to the first number of CSI processing units multiplied by an integer.

In a twenty-first aspect, in combination with one or more of the sixteenth through twentieth aspects, the BS determines the integer based on at least one of: the number of FD units for CSI reporting or the FD unit size.

In a twenty-second aspect, in combination with one or more of the sixteenth through twenty-first aspects, the BS determines the integer based on at least one of: a ratio of the number of FD units for CSI reporting to the first threshold or a ratio of the second threshold to the FD unit size.

In a twenty-third aspect, in combination with one or more of the sixteenth through twenty-second aspects, the first threshold includes the total number of CQI subband contained in a bandwidth part (BWP) and/or the second threshold is equal to the CQI subband size.

In a twenty-fourth aspect, in combination with one or more of the sixteenth through twenty-third aspects, the CSI report configuration configures one or more CSI reference signal (CSI-RS) resources for channel measurement; and the first and second number of CSI processing units scales with the number of CSI-RS resources configured for channel measurement.

In a twenty-fifth aspect, in combination with one or more of the sixteenth through twenty-fourth aspects, determining the at least one time threshold includes determining a first set of time thresholds when the number of FD units for reporting CSI is equal to or below a threshold; and determining a second set of time thresholds when the number of FD units for reporting CSI is above the threshold.

In a twenty-sixth aspect, in combination with one or more of the sixteenth through twenty-fifth aspects, each of the second set of time thresholds is greater than each of the first set of time thresholds.

In a twenty-seventh aspect, in combination with one or more of the sixteenth through twenty-sixth aspects, the first and second sets of time thresholds each includes one or more first time thresholds for a minimum timing between reception of downlink control information (DCI) triggering CSI reporting and transmission of the CSI report; and one or more second time thresholds for a minimum timing between reception of CSI reference signals (CSI-RS) and transmission of the CSI report.

In a twenty-eighth aspect, in combination with one or more of the sixteenth through twenty-seventh aspects, the BS determines the CSI report is an updated CSI report when the both of the determined first and second time thresholds are satisfied; and determines the CSI report is a non-updated CSI report when at least one of first and second time thresholds are not satisfied.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU). In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a channel state information (CSI) reporting configuration, the CSI reporting configuration including a number of frequency domain (FD) units and a FD unit size for CSI reporting;
   determining a number of CSI processing units at the UE, at least one CSI time threshold, or both based on the number of FD units, the FD unit size, or both, wherein the number of CSI processing units at the UE corresponds to a number of concurrent CSI calculations at the UE, wherein determining the number of CSI processing units comprises:
   determining a first number of CSI processing units when the number of FD units for CSI reporting is equal to or below a first threshold or when the FD unit size for CSI reporting is equal to or larger than a second threshold; and
   determining a second number of CSI processing units when the number of FD units for CSI reporting is above the first threshold or when the FD unit size for CSI reporting is below the second threshold; and
   processing the CSI report based on the number of CSI processing units at the UE, the at least one CSI time threshold, or both.

2. The method of claim 1, wherein the CSI comprises compressed subband precoding matrix indicator (PMI) feedback.

3. The method of claim 1, wherein the FD units comprise subbands.

4. The method of claim 1, wherein:
   the CSI includes at least precoder information feedback and channel quality indicator (CQI) feedback;
   the FD unit size for the precoder information feedback is determined based on a subband size for the CQI feedback divided by a predefined integer; and
   the method further comprises determining the number of FD units as a total number of subbands for the CQI feedback multiplied by the predefined integer.

5. The method of claim 1, wherein processing the CSI report includes computing the CSI using the number of CSI processing units.

6. The method of claim 1, wherein the second number of CSI processing units is equal to the first number of CSI processing units multiplied by an integer.

7. The method of claim 6, further comprising determining the integer based on at least one of: the number of FD units for CSI reporting or the FD unit size.

8. The method of claim 6, further comprising determining the integer based on at least one of: a ratio of the number of FD units for CSI reporting to the first threshold or a ratio of the second threshold to the FD unit size.

9. The method of claim 6, wherein at least one of:
   the first threshold comprises a total number of CQI subbands contained in a bandwidth part (BWP); or
   the second threshold is equal to a CQI subband size.

10. The method of claim 1, wherein:
    the CSI reporting configuration configures one or more CSI reference signal (CSI-RS) resources for channel measurement; and
    the first number of CSI processing units and the second number of CSI processing units scales with the number of CSI-RS resources for channel measurement.

11. The method of claim 1, wherein determining the at least one CSI time threshold comprises:
    determining a first set of CSI time thresholds when the number of FD units for CSI reporting is equal to or below a threshold; and
    determining a second set of CSI time thresholds when the number of FD units for CSI reporting is above the threshold.

12. The method of claim 11, wherein each of the second set of CSI time thresholds is greater than each of the first set of CSI time thresholds.

13. The method of claim 11, wherein the first set of CSI time thresholds and the second set of CSI time thresholds each comprises:
   one or more first CSI time thresholds for a minimum timing between reception of downlink control information (DCI) triggering CSI reporting and transmission of the CSI report; and
   one or more second CSI time thresholds for a minimum timing between reception of CSI reference signals (CSI-RS) and transmission of the CSI report.

14. The method of claim 13, further comprising:
   updating the CSI report when both of the first and second sets of time thresholds are satisfied; and
   sending a non-updated CSI report when at least one threshold of the first or second sets of time thresholds are not satisfied.

15. A method for wireless communications by a network entity, comprising:
   determining a number of channel state information (CSI) processing units for a user equipment (UE), wherein determining the number of CSI processing units comprises:
      determining a first number of CSI processing units when a number of frequency domain (FD) units for CSI reporting is equal to or below a first threshold or when an FD unit size for CSI reporting is equal to or larger than a second threshold; and
      determining a second number of CSI processing units when the number of FD units for CSI reporting is above the first threshold or when the FD unit size for CSI reporting is below the second threshold
   configuring the UE with a CSI reporting configuration, wherein the CSI reporting configuration includes the number of FD units and the FD unit size for CSI reporting based on the number of CSI processing units for the UE, at least one CSI time threshold, or both, and wherein the number of CSI processing units corresponds to a number of concurrent CSI calculations at the UE; and
   receiving a CSI report from the UE based on the CSI reporting configuration.

16. The method of claim 15, wherein the CSI comprises compressed subband precoding matrix indicator (PMI) feedback.

17. The method of claim 15, wherein:
   the CSI includes at least precoder information feedback and channel quality indicator (CQI) feedback;
   the FD unit size for the precoder information feedback is determined based on a subband size for the CQI feedback divided by a predefined integer; and
   the method further comprises determining a total number of FD units as a total number of subbands for the CQI feedback multiplied by the predefined integer.

18. The method of claim 15, wherein the second number of CSI processing units is equal to the first number of CSI processing units multiplied by an integer.

19. The method of claim 18, further comprising determining the integer based on at least one of: the number of FD units for CSI reporting or the FD unit size.

20. The method of claim 18, further comprising determining the integer based on at least one of: a ratio of the number of FD units for CSI reporting to the first threshold or a ratio of the second threshold to the FD unit size.

21. The method of claim 18, wherein at least one of:
   the first threshold comprises a total number of CQI subbands contained in a bandwidth part (BWP); or
   the second threshold is equal to a CQI subband size.

22. The method of claim 15, wherein:
the CSI reporting configuration configures one or more CSI reference signal (CSI-RS) resources for channel measurement; and
the first number of CSI processing units and the second number of CSI processing units scales with the number of CSI-RS resources for channel measurement.

23. The method of claim 15, wherein determining the at least one CSI time threshold comprises:
determining a first set of CSI time thresholds when the number of FD units for CSI reporting is equal to or below a threshold; and
determining a second set of CSI time thresholds when the number of FD units for CSI reporting is above the threshold.

24. The method of claim 23, wherein each of the second set of CSI time thresholds is greater than each of the first set of CSI time thresholds.

25. The method of claim 23, wherein the first set of CSI time thresholds and the second set of CSI time thresholds each comprises:
one or more first CSI time thresholds for a minimum timing between reception of downlink control information (DCI) triggering CSI reporting and transmission of the CSI report; and
one or more second CSI time thresholds for a minimum timing between reception of CSI reference signals (CSI-RS) and transmission of the CSI report.

26. The method of claim 25, further comprising:
determining the CSI report is an updated CSI report when both of the first and second sets of CSI time thresholds are satisfied; and
determining the CSI report is a non-updated CSI report when at least one threshold of the first and second sets of CSI time thresholds are not satisfied.

27. An apparatus for wireless communications, comprising:
a memory comprising computer-executable instructions; and
at least one processor coupled with the memory and configured to execute the computer-executable instructions and cause the apparatus to:
receive a channel state information (CSI) reporting configuration, the CSI reporting configuration including a number of frequency domain (FD) units and a FD unit size for CSI reporting;
determine a number of CSI processing units at the apparatus, at least one CSI time threshold, or both based on the number of FD units, the FD unit size, or both, wherein the number of CSI processing units at the apparatus corresponds to a number of concurrent CSI calculations at the apparatus, wherein the at least one processor being configured to cause the apparatus to determine the number of CSI processing units comprises the at least one processor being configured to cause the apparatus to:
determine a first number of CSI processing units when the number of FD units for CSI reporting is equal to or below a first threshold or when the FD unit size for CSI reporting is equal to or larger than a second threshold; and
determine a second number of CSI processing units when the number of FD units for CSI reporting is above the first threshold or when the FD unit size for CSI reporting is below the second threshold; and
process the CSI report based on the number of CSI processing units at the apparatus, the at least one CSI time threshold, or both.

28. An apparatus for wireless communications, comprising:
a memory comprising computer-executable instructions; and
at least one processor coupled with the memory and configured to execute the computer-executable instructions and cause the apparatus to:
determining a number of channel state information (CSI) processing units for a user equipment (UE), wherein determining the number of CSI processing units comprises:
determine a first number of CSI processing units when a number of frequency domain (FD) units for CSI reporting is equal to or below a first threshold or when an FD unit size for CSI reporting is equal to or larger than a second threshold; and
determine a second number of CSI processing units when the number of FD units for CSI reporting is above the first threshold or when the FD unit size for CSI reporting is below the second threshold
configure the UE with a CSI reporting configuration, wherein the CSI reporting configuration includes the number of FD units and the FD unit size for CSI reporting based on the number of CSI processing units for the UE, at least one CSI time threshold, or both, and wherein the number of CSI processing units corresponds to a number of concurrent CSI calculations at the UE; and
receive a CSI report from the UE based on the CSI reporting configuration.

* * * * *